United States Patent
Yasuda et al.

(10) Patent No.: US 7,620,074 B2
(45) Date of Patent: Nov. 17, 2009

(54) COMMUNICATION SYSTEM, MASTER COMMUNICATION DEVICE, AND SLAVE COMMUNICATION DEVICE

(75) Inventors: Takeshi Yasuda, Yokohama (JP); Yoshihiro Ashi, Yokohama (JP); Ken Mutou, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 487 days.

(21) Appl. No.: 11/511,301

(22) Filed: Aug. 29, 2006

(65) Prior Publication Data

US 2007/0086487 A1    Apr. 19, 2007

(30) Foreign Application Priority Data

Sep. 28, 2005    (JP)    ............... 2005-281469

(51) Int. Cl.
*H04J 3/06* (2006.01)
(52) U.S. Cl. ........................................ 370/503
(58) Field of Classification Search ............... 370/503, 370/509, 510, 511
See application file for complete search history.

(56) References Cited

U.S. PATENT DOCUMENTS

| | | | |
|---|---|---|---|
| 5,054,020 A * | 10/1991 | Meagher | 370/305 |
| 7,023,833 B1 * | 4/2006 | Aiello et al. | 370/348 |
| 7,028,204 B2 * | 4/2006 | Jammes et al. | 713/400 |
| 7,483,450 B1 * | 1/2009 | Giese et al. | 370/507 |
| 2006/0112191 A1 * | 5/2006 | Ooi | 709/248 |

FOREIGN PATENT DOCUMENTS

| | | |
|---|---|---|
| JP | 05-268202 | 10/1993 |
| JP | 2000-126394 | 5/2000 |
| JP | 2000-332802 | 11/2000 |
| JP | 2001 186180 | 7/2001 |
| JP | 2004 274766 | 9/2004 |
| JP | 2005 184092 | 7/2005 |
| JP | 2005 184284 | 7/2005 |

* cited by examiner

*Primary Examiner*—Derrick W Ferris
*Assistant Examiner*—Mohammad Anwar
(74) *Attorney, Agent, or Firm*—Brundidge & Stanger, P.C.

(57) ABSTRACT

A communication system is provided which allows synchronous devices in different synchronous communication networks to have synchronous communications with one another via an asynchronous communication network. In the communication system of the present invention, a master communication device generates a master clock based on a reference clock which is provided by a clock supplier. The master communication device sends a synchronization information frame, which contains information about the generated master clock, to plural slave communication devices via the asynchronous communication network. The slave communication devices each reproduce the master clock from the received synchronization information frame.

4 Claims, 8 Drawing Sheets

COMMUNICATION SYSTEM, MASTER COMMUNICATION DEVICE, AND SLAVE COMMUNICATION DEVICE

BACKGROUND OF THE INVENTION

The present invention relates to a technique for synchronous communication through an asynchronous network.

DESCRIPTION OF THE RELATED ART

Synchronous digital hierarchy (SDH) is a known multiplexing method which can be applied with efficiency to various services dealing with audio (e.g., telephone services), images, and the like. A network which employs SDH is a synchronous network. If a communication device in one network using SDH is to communicate with a communication device in another network using SDH, the networks and communication devices have to be in sync with each other.

A network is synchronized with another network by, for example, a method in which a clock generator which generates a reference clock of high precision delivers the reference clock to each network via a dedicated line, a method in which an upper level network generates a clock based on a reference clock and supplies the generated clock to a lower level network, or a method in which a device in the lower level network reproduces a clock from data sent from the upper level network in sync with a reference clock.

Layer 2 switches used in Ethernet (registered trademark) can be combined to build a large network called a wide-area Ethernet, which has lately become available. Layer 2 switches are inexpensive and require less maintenance work compared to routers. These and other characteristics of layer 2 switches enable a telecommunication carrier which provides wide-area Ethernet to keep the cost of installing an infrastructure low and set an inexpensive user fee. This may cause users to consider switching from their current SDH synchronous networks to asynchronous networks which use wide-area Ethernet as a network over which telephone and other services mentioned above are provided.

However, it is not practical in replacing a synchronous network with asynchronous wide-area Ethernet to remove the entirety of the synchronous network at once. In the transition period, the synchronous and asynchronous networks are both present in a mixed manner and, although data in the synchronous network can be relayed to the asynchronous network or vice versa by mapping TDM signals in the synchronous network onto a frame which is used in wide-area Ethernet, an additional technique of keeping synchronous networks in sync with each other is needed.

Japanese Patent Laid-open Publication No. 2000-332802 (hereinafter, referred to as Patent Document 1) discloses a technique of communicating over a LAN, which is an asynchronous network, while maintaining the synchronized state. With the technique described in Patent Document 1, a data sender attaches a time stamp value of a synchronization counter to a transmission packet before sending the packet over a LAN, and a receiver extracts the time stamp value from the received data, detects that its own counter is off and makes its counter synchronized with the counter of the sender, thereby accomplishing a synchronous communication.

SUMMARY OF THE INVENTION

The technique described in Patent Document 1 has been made with only synchronization in a one-to-one communication in mind; the receiver adjusts its internal clock such that the internal clock is in sync with the clock of the sender based on the time stamp value sent along with the data from the sender. In the case where one communication device communicates with plural communication devices, synchronizing its own internal clock with one of time stamp values sent along with data from the respective communication devices does not ensure communications with the rest of the plural communication devices, unless the sender communication devices are in sync with one another.

Furthermore, when the sender communication device is not capable of generating a correct time stamp value due to a failure in the internal clock, the receiver, having no way of knowing the fact, adjusts its internal clock in accordance with an incorrect time stamp value received and thereby makes it impossible to transmit or receive data properly.

The present invention has been made in view of the above circumstances, and an object of the present invention is therefore to enable communication devices in plural synchronous communication networks to have synchronous communications with one another via an asynchronous network.

To attain the above object, in a communication system of the present invention, a master communication device generates a master clock based on a reference clock, which is provided by a clock supplier, and sends a synchronization information frame, which contains information about the generated master clock, to plural slave communication devices via an asynchronous network, and the slave communication devices respectively reproduce the master clock from the received synchronization information frame.

For example, the present invention relates to a communication system using an asynchronous communication network for synchronous communication, characterized in that the communication system includes: a clock supplier which generates a reference clock; a master communication device interposed between the clock supplier and the asynchronous communication network; and plural slave communication devices one of which is provided for each of plural synchronous communication networks and is interposed between a corresponding synchronous communication network and the asynchronous communication network, and in that: the master communication device includes: a reference clock receiving means which receives the reference clock generated by the clock supplier; a master clock generating means which generates a master clock which is synchronized with the reference clock received by the reference clock receiving means; a synchronization information generating means which generates synchronization information which contains information about the master clock; and a synchronization information frame transmitting means which generates a synchronization information frame which stores the synchronization information, and which sends the generated synchronization information frame to the slave communication devices through the asynchronous communication network; and each of the slave communication devices includes: an asynchronous frame transmitting and receiving means which receives, through the asynchronous communication network, a synchronization information frame sent from the master communication device and an asynchronous frame sent from another slave communication device, and which sends an asynchronous frame to another slave communication device through the asynchronous communication network; a synchronous frame transmitting and receiving means connected to the synchronous communication network, which communicates a synchronous frame with communication machines in the synchronous communication network; a frame converting means which converts a synchronous frame which is received by the synchronous frame transmitting and receiving means into an asynchronous frame format, to have the asynchronous frame transmitting and receiving means send an asynchronous frame obtained through the conversion, and which converts an asynchronous frame which is received by the asynchronous frame transmitting and receiving means into a synchronous frame format, to have the synchronous frame transmitting and receiving means send a synchronous frame obtained through the conversion; a synchronous frame extracting means which extracts the synchronization information frame from a frame which is received by the asynchronous frame transmitting and receiving means; and a clock reproducing means which reproduces the master clock from the synchronization information frame extracted by the synchronous frame extracting means, and which supplies the reproduced master clock to the asynchronous frame transmitting and receiving means, the synchronous frame transmitting and receiving means, the frame converting means, and the synchronous frame extracting means respectively.

According to the communication system of the present invention, communication devices in plural synchronous communication networks can have synchronous communications with one another via an asynchronous network.

DETAILED DESCRIPTION OF THE PREFERRED EMBODIMENTS

The following is a description on an embodiment of the present invention.

Figure 1:
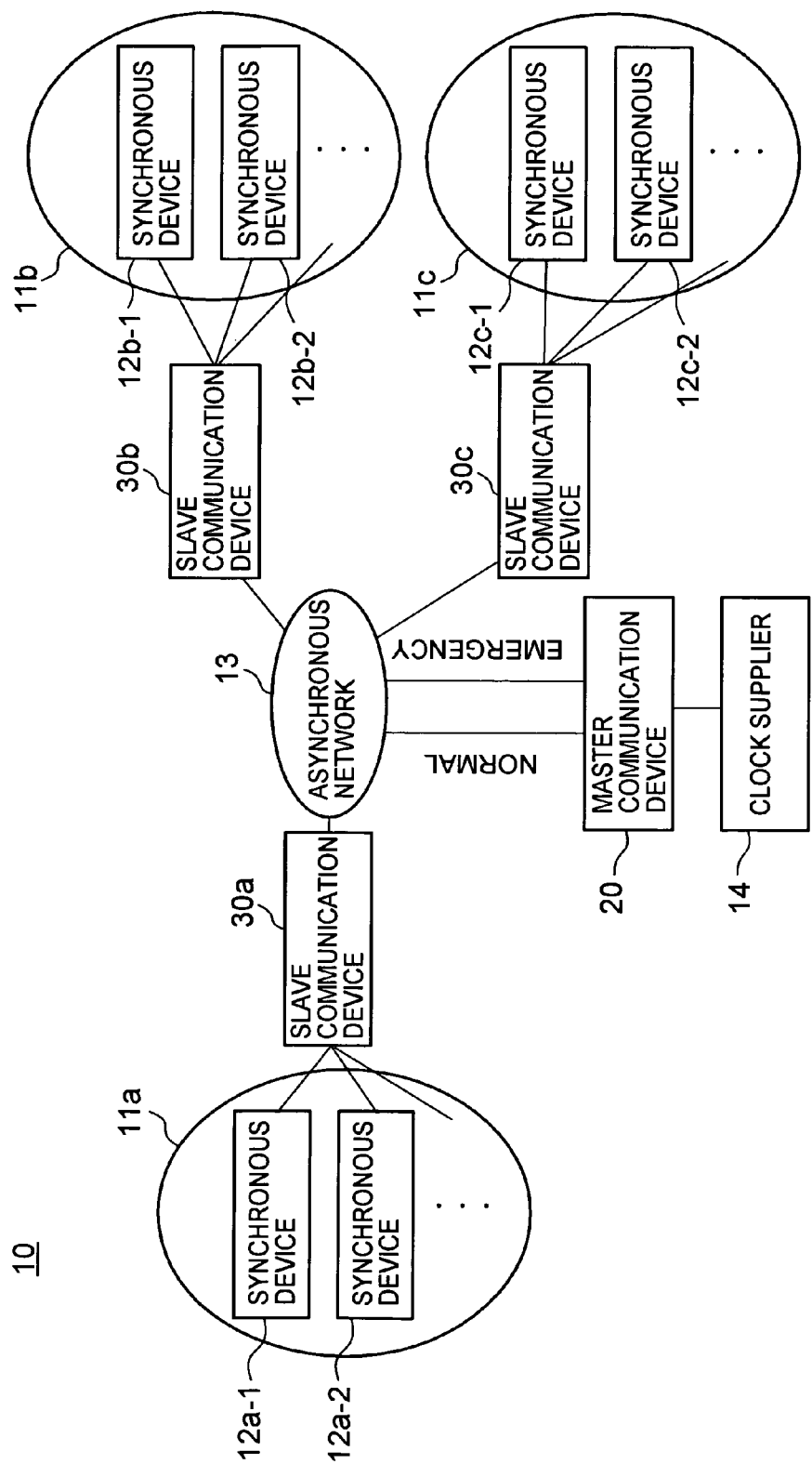
FIG. 1 is a diagram showing a configuration of a communication system according to an embodiment of the present invention.

FIG. 1 shows the configuration of a communication system 10 according to an embodiment of the present invention. The communication system 10 has a clock supplier 14, a master communication device 20, and plural slave communication devices 30. The clock supplier 14 generates a reference clock having high frequency stability at a phase shift amount of $1 \times 10^{-11}$ or less, for example, and provides the reference clock to the master communication device 20.

Based on the reference clock received from the clock supplier 14, the master communication device 20 generates a master clock which has a frequency used in synchronous communications such as asynchronous transfer mode (ATM) and which is a clock synchronized with the reference clock. The master communication device 20 generates a synchronization information frame which contains information about the generated master clock, and sends the generated synchronization information frame to the respective slave communication devices 30 via an asynchronous communication network 13.

The master communication device 20 has, for example, two network interface cards (NICs) which respectively connect the master communication device 20 to two different communication devices in the asynchronous communication network 13. A synchronization information frame which is sent via one of the NICs is a Normal synchronization information frame and a synchronization information frame which is sent via the other NIC is an Emergency synchronization information frame. The master communication device 20 sends the Normal synchronization information frame and the Emergency synchronization information frame to the slave communication devices 30 through the asynchronous communication network 13.

The slave communication devices 30 receive the Normal synchronization information frame and the Emergency synchronization information frame through the asynchronous communication network 13, and reproduce the master clock from the received Normal or Emergency synchronization information frame by a method described later. Each of the slave communication devices 30 manages a synchronous communication network 11 and, when receiving a synchronous frame from one of synchronous devices 12 in the synchronous communication network 11 it manages, checks a time stamp value of a counter which operates in accordance with the reproduced master clock. The slave communication device 30 stores a time stamp value of when the synchronous frame is received in an asynchronous frame along with the received synchronous frame, and sends the asynchronous frame to another slave communication device 30 via the asynchronous communication network 13.

Each slave communication device 30, when it receives an asynchronous frame from another slave communication device 30 through the asynchronous communication network 13, checks a time stamp value in the received asynchronous frame. At a time when the time stamp value in the received asynchronous frame matches the value of its own counter, the slave communication device 30 sends a synchronous frame contained in the received asynchronous frame to the synchronous devices 12 in the synchronous communication network 11 it manages. The synchronous devices 12 in different synchronous communication networks 11 can thus have synchronous communications with one another via the asynchronous communication network 13.

The sender slave communication device 30 stores, in an asynchronous frame, along with a synchronous frame to be sent, the value of the counter which operates in accordance with its own oscillator and the receiver slave communication device 30 adjusts the frequency of its own oscillator to match the frequency of the oscillator of the sender slave communication device 30 in accordance with a time stamp value in the received asynchronous frame. In this case, the sender slave communication device 30 and the receiver slave communication device 30 can have the synchronous devices 12 in different synchronous communication networks 11 communicate synchronously with each other.

In the case where one slave communication device 30 has synchronous communications with plural slave communication devices 30, on the other hand, the one slave communication device 30 receives from the plural slave communication devices 30 asynchronous frames containing time stamp values of the respective slave communication devices 30 whose oscillators are not in sync with one another. Then the one slave communication device 30 cannot establish synchronization with all of the slave communication devices 30 and may fail to properly transfer synchronous frames contained in the received asynchronous frames to the synchronous devices 12 in its synchronous communication network 11.

In contrast, the slave communication devices 30 in the communication system 10 of this embodiment can synchronize the frequency and phase of their clocks with one another based on the synchronization information frame received from the master communication device 20. Each slave communication device 30 can therefore properly perform one-to-n synchronous communication via the asynchronous communication network 13 in addition to one-to-one synchronous communication via the asynchronous communication network 13.

The asynchronous communication network 13 of this embodiment is, for example, a wide-area Ethernet network built from layer 2 switches. A communication path between the master communication device 20 and each of the slave communication devices 30 is physically the same network as the one used by other users of the asynchronous communication network 13, but is virtually a different communication path.

The asynchronous communication network 13 forms a virtually different path with the use of, for example, VLAN technology conforming to IEEE 802.1Q. A VLAN header is attached to a frame which is transferred in the asynchronous communication network 13, and layer 2 switches in the asynchronous communication network 13 transfer the frame only to communication machines along the relevant virtual communication path.

Each VLAN header contains a field showing the priority of a frame to which the VLAN header is attached. When a layer 2 switch, connected directly to the master communication device 20, attaches a VLAN header to a synchronization information frame received from the master communication device 20, the layer 2 switch sets a value indicating priority in the VLAN header with a higher priority than a value indicating priority in a VLAN header of a communication frame which is communicated among the plural slave communication devices 30 through the asynchronous communication network 13, and transfers the synchronization information frame to another layer 2 switch in the asynchronous communication network 13. Synchronization information frames are thus transferred preferentially in the asynchronous communication network 13. This improves the probability of slave communication devices 30 successfully receiving synchronization information frames, and keeps the accuracy of the reproduced master clock at a higher level.

Figure 2:
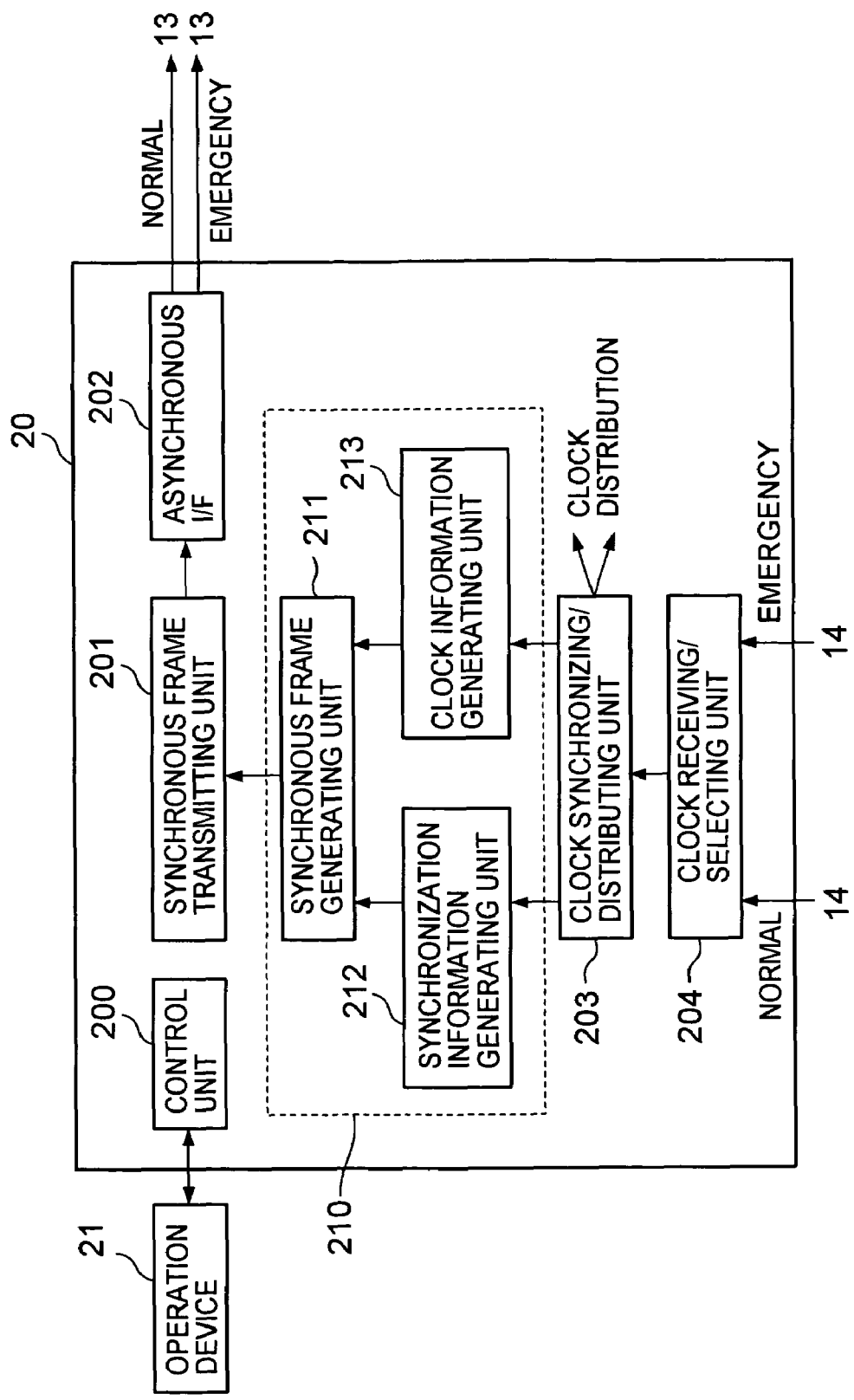
FIG. 2 is a diagram showing an example of a detailed function configuration of a master communication device.

FIG. 2 shows an example of a detailed function configuration of the master communication device 20. The master communication device 20 has a control unit 200, a synchronous frame transmitting unit 201, an asynchronous interface 202, a clock synchronizing/distributing unit 203, a clock receiving/selecting unit 204, and a master clock information generating unit 210.

The clock receiving/selecting unit 204 receives the reference clock from the clock supplier 14 via two dedicated lines, and supplies the reference clock, received through one of the dedicated lines, to the clock synchronizing and distributing unit 203. The clock receiving and selecting unit 204 uses one of the dedicated lines as a Normal line and the other as an Emergency line. The clock receiving and selecting unit 204 receives the reference clock via the Emergency dedicated line when it is not possible to receive the reference clock normally through the Normal dedicated line.

The clock synchronizing/distributing unit 203 generates the master clock synchronized with the reference clock supplied from the clock receiving/selecting unit 204, and provides the generated master clock to the master clock information generating unit 210 and the respective blocks in the master communication device 20.

The master clock information generating unit 210 has a synchronous frame generating unit 211, a synchronization information generating unit 212, and a clock information generating unit 213. The clock information generating unit 213 monitors the clock synchronizing/distributing unit 203 and, when requested by the synchronous frame generating unit 211 to provide clock information which shows whether the clock synchronizing/distributing unit 203 is generating the master clock normally or not, sends the current clock information of the clock synchronizing/distributing unit 203 to the synchronous frame generating unit 211.

The clock information generating unit 213 judges that the clock synchronizing/distributing unit 203 is not generating the master clock normally when, for example, a failure in the clock synchronizing/distributing unit 203 prevents the clock synchronizing/distributing unit 203 from synchronizing with the reference clock, or when neither the Normal dedicated line nor the Emergency dedicated line can pass the reference clock to the clock receiving/selecting unit 204 from the clock supplier 14, causing the clock synchronizing/distributing unit 203 to run on its own.

The synchronization information generating unit 212 makes a counter operate in accordance with the master clock generated by the clock synchronizing/distributing unit 203. When requested by the synchronous frame generating unit 211 to provide a time stamp value, the synchronization information generating unit 212 sends a counter value upon reception of the request to the synchronous frame generating unit 211 as a time stamp value.

The synchronous frame generating unit 211 follows a preset schedule which transmits a synchronization information frame in obtaining a time stamp value from the synchronization information generating unit 212 and clock information from the clock information generating unit 213. The synchronous frame generating unit 211 generates a synchronization information frame which contains the obtained time stamp value and clock information and which is assigned a sequence number as an identifier unique to each synchronization information frame. The generated synchronization information frame is sent to the synchronous frame transmitting unit 201.

The synchronous frame transmitting unit 201 makes copies of the synchronization information frame obtained from the synchronous frame generating unit 211, and attaches information indicating whether it is Normal or Emergency to each copy, thereby generating two types of synchronization information frame. The synchronous frame transmitting unit 201 then makes as many copies of the generated two types of synchronization information frame as the number of destination slave communication devices 30, attaches information which identifies the destination slave communication devices 30 to the respective copies of the synchronization information frames, and sends the copies to the asynchronous interface 202. The asynchronous interface 202 sends the Normal synchronization information frame and the Emergency synchronization information frame to the asynchronous communication network 13 through different NICs.

An operation device 21 is an external device which monitors the master communication device 20 for a failure and which is also used to set information necessary to the master communication device 20 such as where to send a synchronization information frame. Processing of the control unit 200 includes controlling the components of the master communication device 20 in accordance with setting information received from the operation device 21, and notifying the operation device 21 of a failure detected in the master communication device 20.

Figure 3:
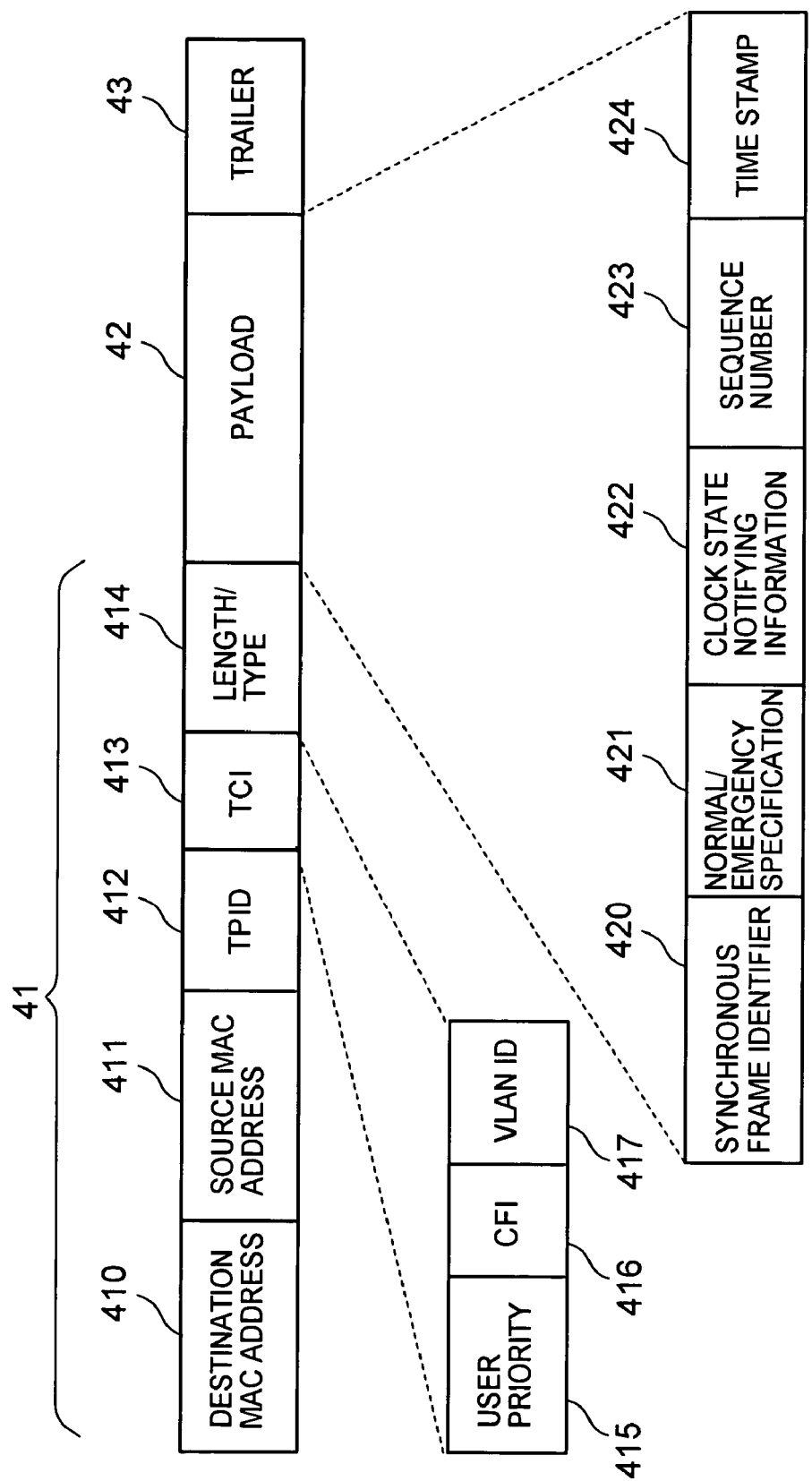
FIG. 3 is a diagram showing an example of the data configuration of a synchronization information frame.

FIG. 3 shows an example of a data configuration of a synchronization information frame 40. The synchronization information frame 40 is composed of a MAC header 41, a payload 42, and a trailer 43.

The MAC header 41 is composed of a transmission destination MAC address 410, a transmission source MAC address 411, TPID 412, TCI 413, and a length/type 414. The TPID 412 and the TCI 413 are information attached by a communication device in the asynchronous communication network 13, and used to establish communications over VLAN. The TCI 413 is composed of a user priority 415, CFI 416 and a VLAN_ID 417. The VLAN_ID 417 is used to differentiate the VLAN.

The user priority 415 is a value indicating a priority level. The user priority 415, attached to the synchronization information frame 40, is set to a value of higher priority than a value attached to a communication frame communicated among the slave communication devices 30 through the asynchronous communication network 13. The synchronization information frame 40 is thus transferred preferentially in the asynchronous communication network 13. This improves the probability of successful reception of the synchronization information frame by the slave communication devices 30 and keeps the accuracy of the reproduced master clock at a higher level.

The payload 42 is composed of a synchronous frame identifier 420, Normal/Emergency specification 421, clock state notifying information 422, a sequence number 423, and a time stamp 424. The synchronous frame identifier 420 is information indicating whether or not this frame is a synchronization information frame. For instance, the synchronous frame identifier 420 is 1-bit information, and a value 1 stored as the synchronous frame identifier 420 indicates that the frame is the synchronization information frame 40.

The Normal/Emergency specification 421 is information set by the synchronous frame generating unit 211 to show whether the frame is a Normal frame or an Emergency frame. For instance, the Normal/Emergency specification 421 is 1-bit information and a value 1 stored as the Normal/Emergency specification 421 indicates that the frame is a Normal frame. The sequence number 423 is a sequence number set by the synchronization information generating unit 212 and is used for detection of repetitive reception of the same synchronization information frame 40 and confirming the seriality between one synchronization information frame 40 and another synchronization information frame 40. The time stamp 424 is information set by the synchronization information generating unit 212, and is used in the slave communication devices 30 to reproduce the master clock.

The clock state information 422 is information indicating whether or not the master clock is being generated normally by the clock synchronizing/distributing unit 203, and is set by the clock information generating unit 213. Each slave communication device 30 can obtain, from the synchronization information frame 40, information about whether the clock synchronizing/distributing unit 203 is generating the master clock normally or not and thereby avoids adjusting the frequency of its internal clock to the incorrect time stamp 424. In this way, when the clock synchronizing/distributing unit 203 is not capable of normally generating the master clock, the slave communication devices 30 can have synchronous communications with one another for a given period of time by using their internal clocks.

Figure 4:
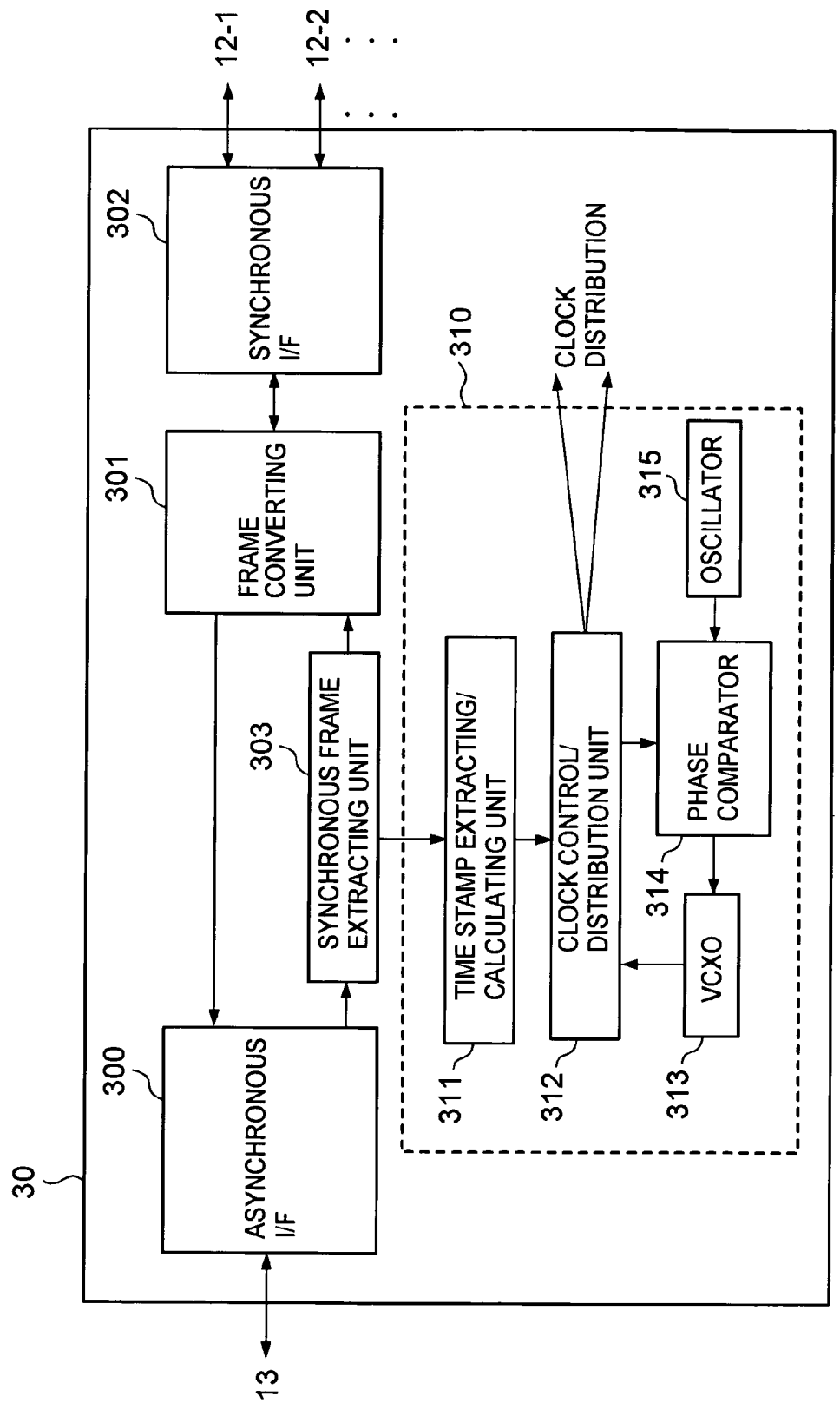
FIG. 4 is a diagram showing an example of a detailed function configuration of a slave communication device.

FIG. 4 shows an example of a detailed function configuration of each slave communication device 30. The slave communication device 30 has an asynchronous interface 300, a frame converting unit 301, a synchronous interface 302, a synchronous frame extracting unit 303, and a master clock reproducing unit 310.

The asynchronous interface 300 receives, via the asynchronous communication network 13, the synchronization information frame 40 sent from the master communication device 20 and an asynchronous frame sent from another slave communication device 30. The asynchronous interface 300 also sends an asynchronous frame to another slave communication device 30 via the asynchronous communication network 13. The term asynchronous frame here refers to a frame having a format which is used in an asynchronous communication method such as Ethernet (registered trademark). The synchronous interface 302 communicates synchronous frames with the synchronous devices 12 in the synchronous communication network 11. The term synchronous frame here refers to a frame having a format which is used in a synchronous communication method such as SDH.

The frame converting unit 301 converts a synchronous frame received by the synchronous interface 302 into an asynchronous frame format, and has the asynchronous interface 300 send the asynchronous obtained through the conversion. The frame converting unit 301 converts a synchronous frame into an asynchronous frame by, for example, mapping a synchronous frame onto the payload of an asynchronous frame. The frame converting unit 301 also converts an asynchronous frame received by the asynchronous interface 300 into a synchronous frame format, and has the synchronous interface 302 send the synchronous frame obtained through the conversion. The frame converting unit 301 converts an asynchronous frame into a synchronous frame by, for example, extracting a synchronous frame which is mapped onto the payload of an asynchronous frame.

The synchronous frame extracting unit 303 extracts the synchronization information frame 40 from a frame received by the asynchronous interface 300. The master clock reproducing unit 310 reproduces the master clock from the synchronization information frame 40 extracted by the synchronous frame extracting unit 303, and provides the reproduced master clock to each block in the slave communication device 30.

A more detailed description is now given on the master clock reproducing unit 310. The master clock reproducing unit 310 has a time stamp extracting/calculating unit 311, a clock control/distribution unit 312, a Voltage Controlled Crystal Oscillator (VCXO) 313, a phase comparator 314, and an oscillator 315.

The time stamp extracting/calculating unit 311 checks the seriality of a sequence number in the synchronization information frame 40 and discards the synchronization information frame 40 which has the same sequence number as the previously received synchronization information frame 40. The time stamp extracting/calculating unit 311 performs a calculation by comparing a time stamp value in the synchronization information frame 40 which has a valid sequence number against past time stamp values received during a given period, and thus reproduces frequency information. The reproduced frequency information is sent to the clock control/distribution unit 312.

In the case where the synchronization information frame 40 contains information indicating that the master communication device 20 is not generating the master clock normally, the time stamp extracting/calculating unit 311 sends frequency information that has been reproduced last time to the clock control/distribution unit 312. When the master communication device 20 is operating normally, on the other hand, the time stamp extracting/calculating unit 311 receives the Normal synchronization information frame 40 and the Emergency synchronization information frame 40. The Emergency synchronization information frame 40 is referred to by the time stamp extracting/calculating unit 311 during failure monitoring.

The oscillator 315 generates a frequency which serves to the phase comparator 314 as the reference. A crystal oscillator, for example, is employed as the oscillator 315. The oscillator 315 is also used as a self-running clock for an initial state or for when the master communication device 20 is not capable of generating the master clock normally.

The phase comparator 314 compares the phase of a clock from the oscillator 315 against the phase of a reproduced clock from the clock control/distribution unit 312, and supplies a voltage according to the phase difference between the two to the VCXO 313, to thereby adjust the oscillation frequency of the VCXO 313. The clock control/distribution unit 312 provides, as the master clock, a clock from the VCXO 313 to each block in the slave communication device 30.

Figure 5:
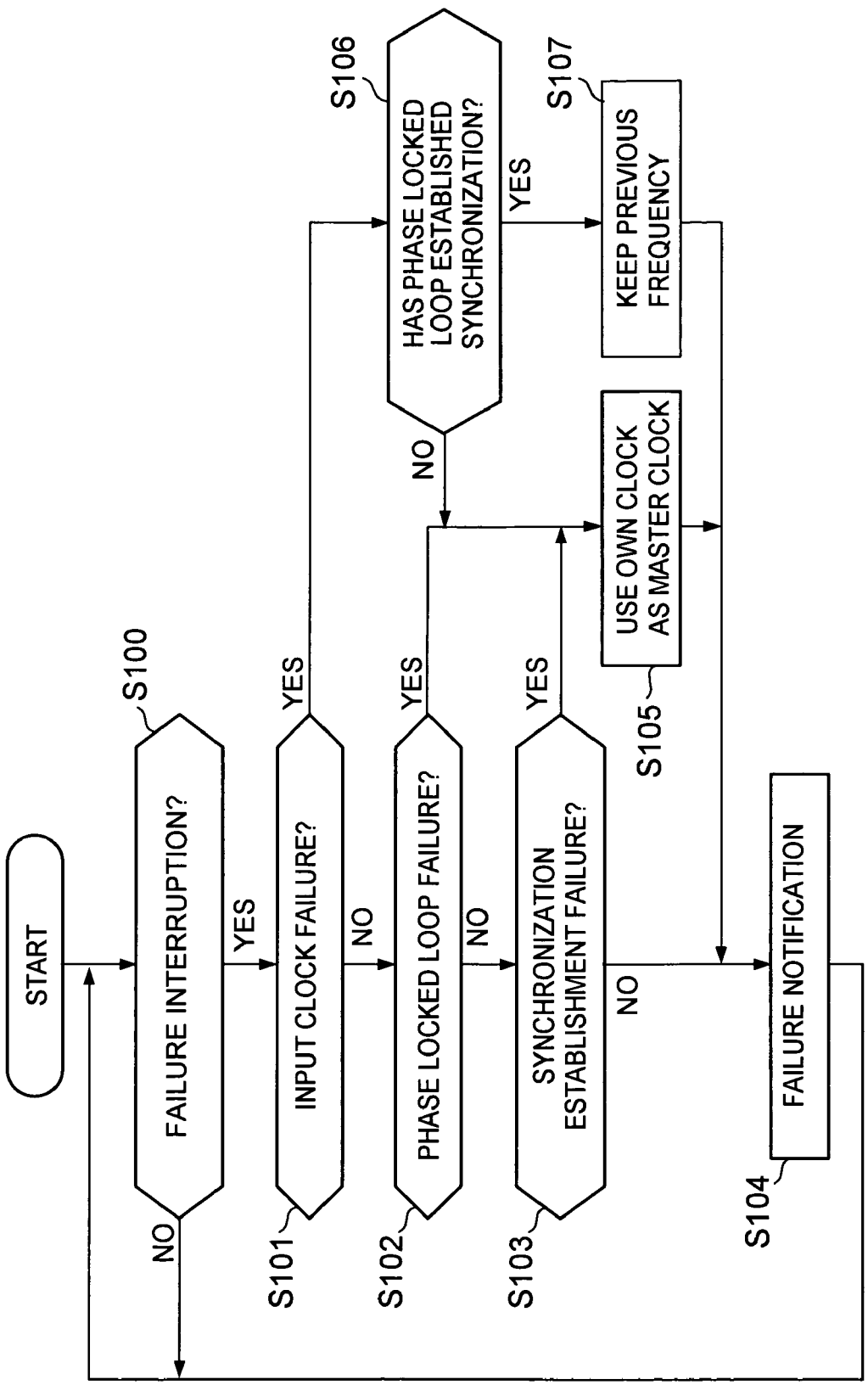
FIG. 5 is a flow chart showing an example of clock state monitoring processing executed by the master communication device.

FIG. 5 is a flow chart showing an example of clock state monitoring processing which is executed by the master communication device 20. The master communication device 20 starts the clock state monitoring processing shown in this flow chart at a given timing such as when the power is turned on.

First, the clock synchronizing/distributing unit 203 judges whether or not there has been an interruption indicating a failure (S100). When a failure interruption is not detected (S100: No), the clock synchronizing/distributing unit 203 repeats Step S100 until a failure interruption occurs.

When a failure interruption is detected (S100: Yes), the clock synchronizing/distributing unit 203 judges whether or not the failure which has occurred is an input clock failure, which indicates that neither the Normal dedicated line nor the Emergency dedicated line can pass the reference clock to the clock receiving/selecting unit 204 from the clock supplier 14 (S101).

In the case where the failure is not an input clock failure (S101: No), the clock synchronizing/distributing unit 203 judges whether or not the failure which has occurred is a phase locked loop failure in the clock synchronizing/distributing unit 203 (S102). When the failure is not a phase locked loop failure (S102: No), the clock synchronizing/distributing unit 203 judges whether or not the failure which has occurred is a synchronization establishment failure of a phase locked loop in the clock synchronizing/distributing unit 203 (S103) In the case where the failure is not a synchronization establishment failure (S103: No), the clock synchronizing/distributing unit 203 notifies the operation device 21 of the failure through the control unit 200, and again performs the processing shown in Step S100.

In the case where the failure which has occurred is a phase locked loop failure (S102: Yes) or a synchronization establishment failure (S103: Yes), the clock synchronizing/distributing unit 203 stops the phase locked loop, uses a clock of an oscillator in the master communication device 20 as the master clock (S105), and performs processing shown in Step S104.

When the failure which has occurred is an input clock failure (S101: Yes), the clock synchronizing/distributing unit 203 judges whether or not the phase locked loop has established synchronization last time (S106). In the case where the phase locked loop has never established synchronization (S106: No), the clock synchronizing/distributing unit 203 performs the processing shown in Step S105. In the case where the phase locked loop has previously established synchronization (S106: Yes), the clock synchronizing/distributing unit 203 performs hold over processing which keeps the frequency of the phase locked loop to a frequency at which the previous synchronization is established (S107), and then performs the processing shown in Step S104.

Figure 6:
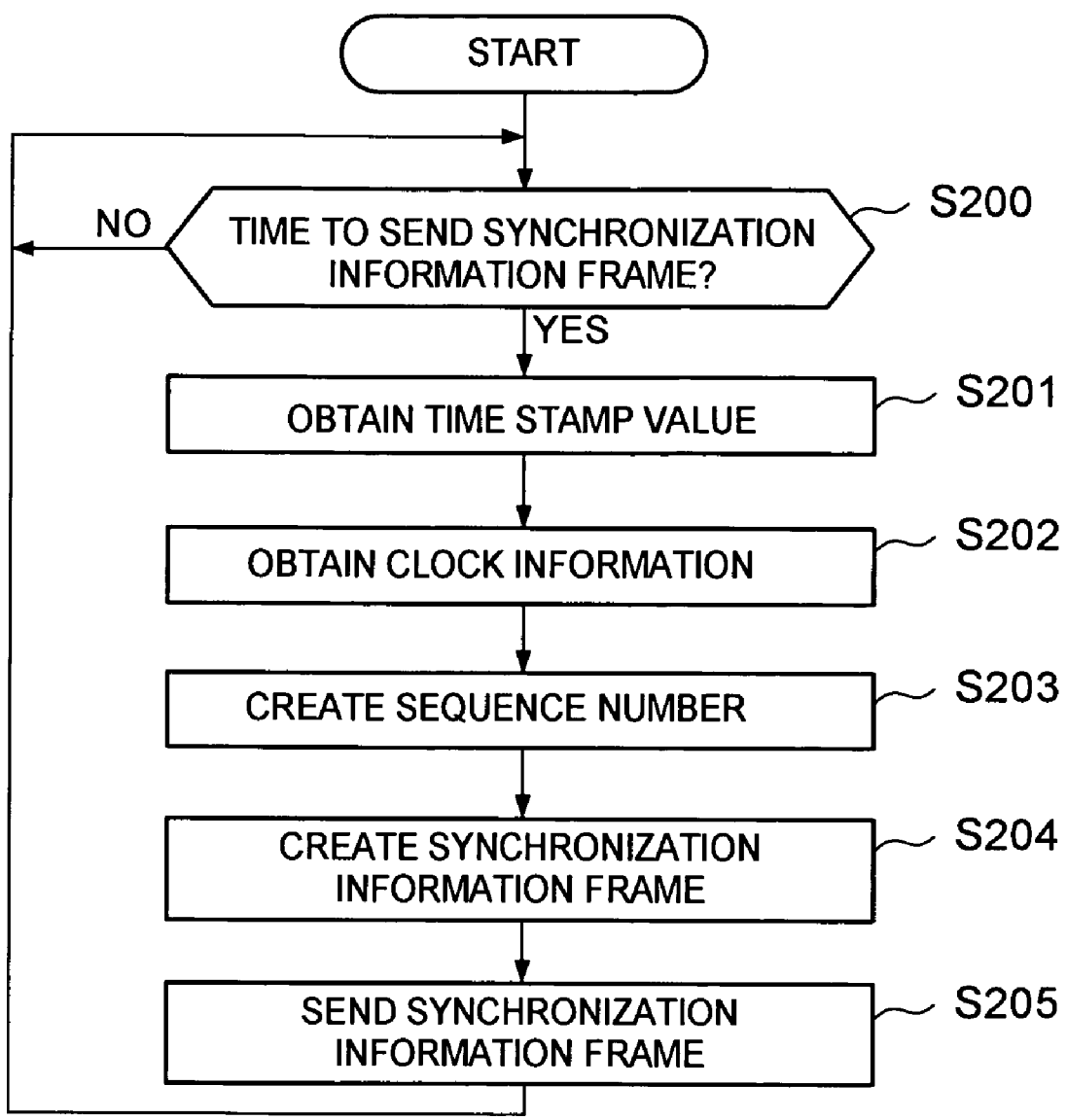
FIG. 6 is a flow chart showing an example of processing executed by the master communication device to transmit the synchronization information frame.

FIG. 6 is a flow chart showing an example of processing which is executed by the master communication device 20 to transmit the synchronization information frame 40. The master communication device 20 starts the processing of transmitting the synchronization information frame 40 shown in this flow chart at a given timing such as when the power is turned on.

First, the synchronous frame generating unit 211 judges whether or not it is time to send the synchronization information frame 40 (S200). When it is not time to send the synchronization information frame 40 (S200: No), the synchronous frame generating unit 211 repeats step S200 until the time to send the synchronization information frame 40 arrives. In this embodiment, the master communication device 20 sends the synchronization information frame 40 to the slave communication devices 30 regularly, for example, at 1-second intervals.

When it is time to send the synchronization information frame 40 (S200: Yes), the synchronous frame generating unit 211 obtains a time stamp value from the synchronization information generating unit 212 (S201). The synchronous frame generating unit 211 then obtains clock information from the clock information generating unit 213 (S202), and generates a sequence number (S203). The synchronous frame generating unit 211 generates the synchronization information frame 40 containing the time stamp value, clock information, and the sequence number (S204).

Next, the synchronous frame transmitting unit 201 copies the synchronization information frame 40 obtained from the synchronous frame generating unit 211, to thereby generate the Normal synchronization information frame 40 and the Emergency synchronization information frame 40. The synchronous frame transmitting unit 201 then makes as many copies of the generated two types of synchronization information frame 40 as the number of destination slave communication devices 30, attaches information which identifies the destination slave communication devices 30 to the respective copies of the synchronization information frames 40, and sends the copies to the asynchronous interface 202. The asynchronous interface 202 sends the Normal synchronization information frame 40 and the Emergency synchronization information frame 40 to the asynchronous communication network 13 through different NICs (S205). Thereafter, the synchronous frame generating unit 211 again performs the processing shown in Step S200.

Figure 7:
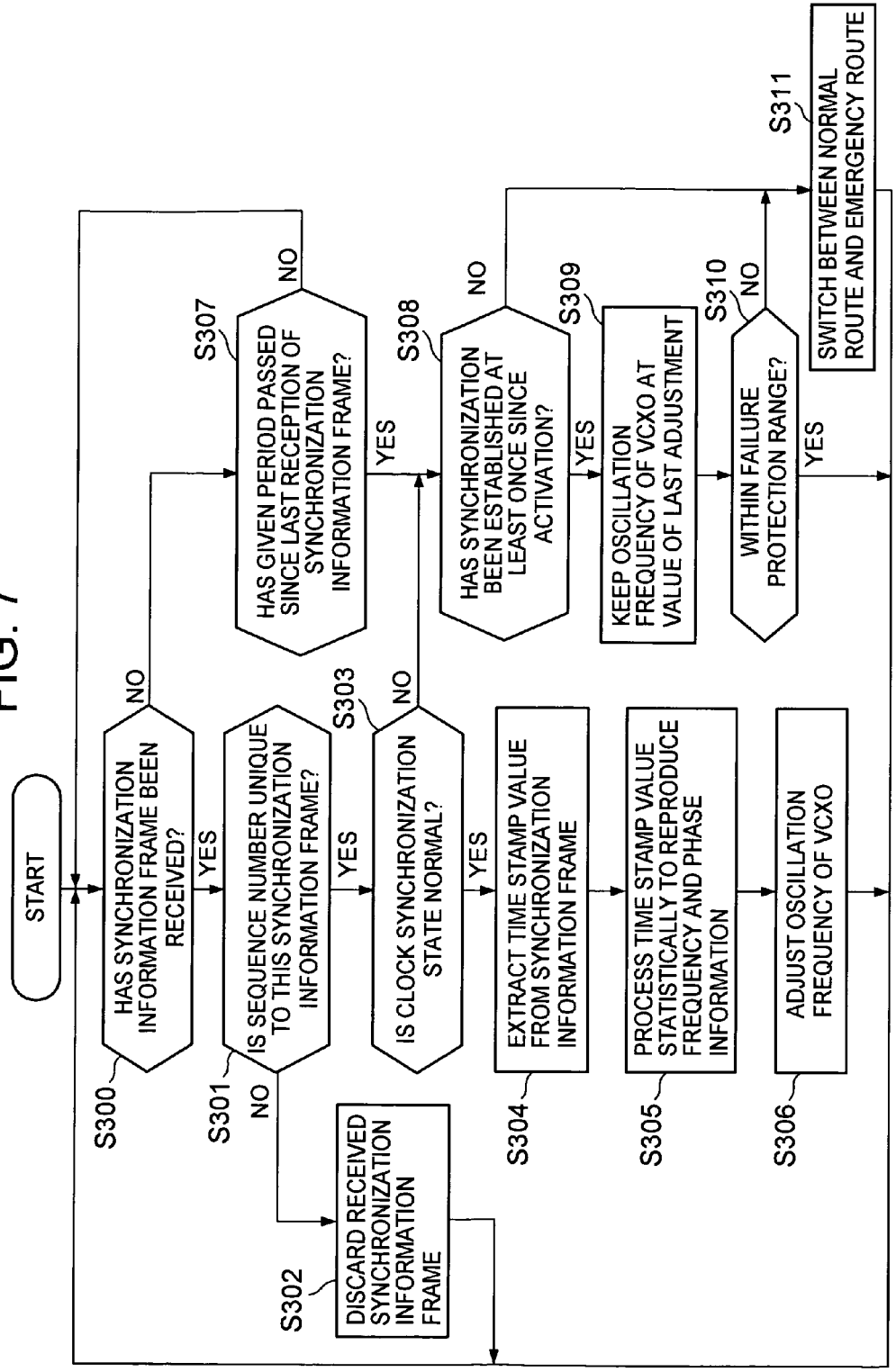
FIG. 7 is a flow chart showing an example of the operation of the slave communication device.

FIG. 7 is a flow chart showing an example of the operation of each slave communication device 30. The slave communication device 30 starts the processing shown in this flow chart at a given timing such as when the power is turned on.

First, the time stamp extracting/calculating unit 311 judges whether or not the synchronization information frame 40 has been received (S300). In the case where the synchronization information frame 40 has been received (S300: Yes), the time stamp extracting/calculating unit 311 checks a sequence number in the received synchronization information frame 40 to judge whether or not the sequence number is the same as that of the previously received synchronization information frame 40 (S301). When the sequence number is a duplicate (S301: Is sequence number unique to this synchronization information frame?—No), the time stamp extracting/calculating unit 311 discards the synchronization information frame 40 received from the synchronous frame extracting unit 303 (S302), and again performs the processing shown in Step S300.

When the sequence number is not a duplicate (S301: Is sequence number unique to this synchronization information frame?—Yes), the time stamp extracting/calculating unit 311 checks the clock state information 422 in the synchronization information frame 40 to judge whether or not the clock synchronizing/distributing unit 203 of the master communication device 20 is generating the master clock normally (S303). In the case where the clock state information 422 of the synchronization information frame 40 indicates that the master clock is not being generated normally (S303: No), the time stamp extracting/calculating unit 311 performs processing shown in Step S308.

In the case where the clock state information 422 of the synchronization information frame 40 indicates that the master clock is being generated normally (S303: Yes), the time stamp extracting/calculating unit 311 extracts the time stamp 424 from the synchronization information frame 40 (S304) The time stamp extracting/calculating unit 311 performs statistical processing on the extracted time stamp 424 to reproduce frequency information and phase information of the master clock, and sends the reproduced information to the clock control/distribution unit 312 (S305).

Next, the phase comparator 314 compares the phase of a clock from the oscillator 315 against the phase of a reproduced clock from the clock control/distribution unit 312, and supplies a voltage according to the phase difference between the two to the VCXO 313, to thereby adjust the oscillation frequency of the VCXO 313 (S306). Thereafter, the time stamp extracting/calculating unit 311 again performs the processing shown in Step S300.

In the case where the synchronization information frame 40 has not been received in Step S300 (S300: No), the time stamp extracting/calculating unit 311 judges whether or not a given period of time has passed since the last time the synchronization information frame 40 is received (S307). The given period of time in Step S307 is, for example, 10 seconds. When the elapsed time does not reach the given period of time (S307: No), the time stamp extracting/calculating unit 311 again performs the processing shown in Step S300.

When the time elapsed since the last reception of the synchronization information frame 40 is equal to or longer than the given period of time (S307: Yes), the time stamp extracting/calculating unit 311 judges whether or not synchronization has been established at least once since the slave communication device 30 is activated (S308). In the case where synchronization has never been established since the activation of the slave communication device 30 (S308: No), the time stamp extracting/calculating unit 311 performs processing shown in Step S310.

In the case where synchronization has been established at least once since the activation of the slave communication device 30 (S308: Yes), the time stamp extracting/calculating unit 311 performs hold over processing which keeps the oscillation frequency of the VCXO 313 to a value of the last adjustment by providing frequency information and phase information of the master clock reproduced last time (S309). The time stamp extracting/calculating unit 311 then judges whether or not a failure which has occurred is within a failure protection range (S310).

Being within the failure protection range means, for example, that the number of times the judgment of Step S310 is made in succession, without interposing the processing of Steps S304 to S306, is less than three times. For instance, when it is determined in Step S303 that the clock state information 422 of the synchronization information frame 40 indicates a problem in generating the master clock normally, or when it is judged in Step S307 twice in succession that the given period of time has passed since the last reception of the synchronization information frame 40 but the subsequently received synchronization information frame 40 is subjected to the processing of Steps S304 to S306 while skipping the judgment of Step S310, the time stamp extracting/calculating unit 311 judges that the failure is within the failure protection range the next time the judgment of Step S310 is made.

When it is judged in Step S310 that the failure is within the failure protection range (S310: Yes), the time stamp extracting/calculating unit 311 again performs the processing shown in Step S300. When the failure is outside the failure protection range (S310: No), the time stamp extracting/calculating unit 311 switches from reception of the Normal synchronization information frame 40 to reception of the Emergency synchronization information frame 40 (S311), and again performs the processing shown in Step S300. However, since a switch is made in the preceding Step S311 from reception of the Normal synchronization information frame 40 to reception of the Emergency synchronization information frame 40, the synchronization information frame 40 which is received from now on is the Emergency synchronization information frame 40. The Normal synchronization information frame 40 is used to monitor the frame failure state until the next time the switch is made.

An embodiment of the present invention has been described above.

As is clear from the above description, the communication system 10 of the present invention allows the synchronous devices 12 in plural synchronous communication networks 11 to have synchronous communications with one another via the asynchronous communication network 13. In addition, each slave communication device 30 can obtain, from the synchronization information frame 40, information about whether the clock synchronizing/distributing unit 203 is generating the master clock normally or not and thereby avoids adjusting the frequency of its internal clock to the incorrect time stamp 424. In this way, when the clock synchronizing/distributing unit 203 is not capable of normally generating the master clock, the slave communication devices 30 can have synchronous communications with one another for a given period of time by using their internal clocks.

The present invention is not limited to the above embodiment, and various modifications can be made without departing from the gist of the present invention.

Figure 8:
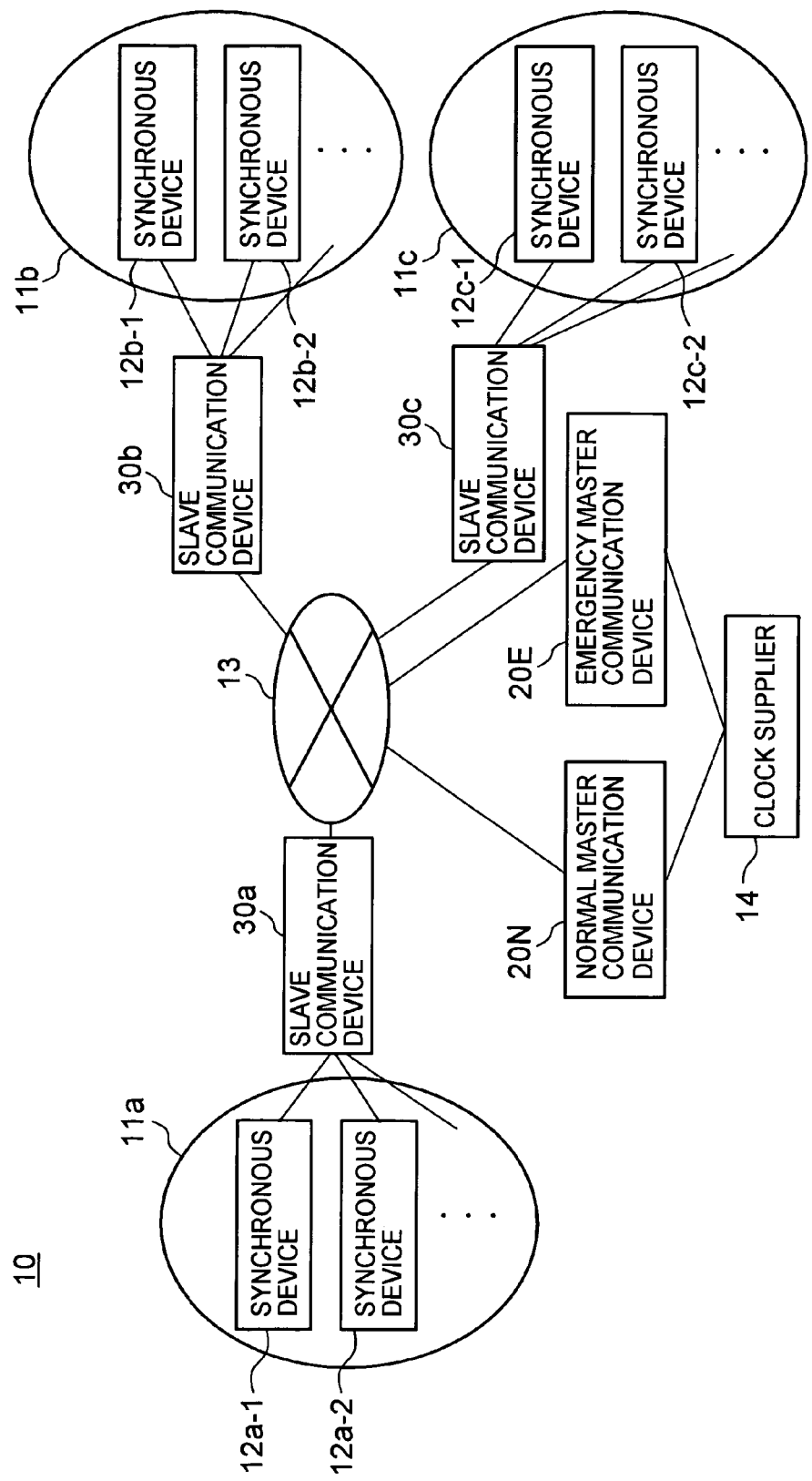
FIG. 8 is a diagram showing another example of the configuration of the communication system.

FIG. 8 shows another example of the configuration of the communication system 10. Components in FIG. 8 which are denoted by the same reference symbols as in FIG. 1 have the same or similar functions to those of the components in FIG. 1 except for some aspects described below.

The communication system 10 has plural master communication devices 20. The master communication devices 20 all receive a reference clock from one clock supplier 14, and generate a master clock synchronized with the received reference clock. One of the master communication devices 20 generates a Normal synchronization information frame whereas the other generates an Emergency synchronization information frame.

In this way, the clock synchronizing/distributing unit 203 which generates a master clock can be set in each of two different devices. The clock synchronizing/distributing unit 203 is thus duplicated and, when a phase locked loop failure occurs in one clock synchronizing/distributing unit 203, the slave communication devices 30 can have without fail synchronous communications with one another by synchronizing with a master clock which is generated by the other clock synchronizing/distributing unit 203.

The master communication devices 20 may send the Normal synchronization information frame 40 and the Emergency synchronization information frame 40 to the respective slave communication devices 30 through different NICs. This gives the system more redundancy and increases the stability of the system.

In the embodiment described above, the slave communication devices 30 reproduce frequency information and phase information of the master clock by performing statistical processing on the time stamp 424 in the synchronization information frame 40. However, the present invention is not limited thereto. For instance, the master clock may be reproduced such that the master communication device 20 sends the synchronization information frame 40 to the slave communication devices 30 via the asynchronous communication network 13 at preset regular time intervals, and the slave communication devices 30 perform statistical processing on the reception interval of the synchronization information frame 40 sent from the master communication device 20.

What is claimed is

1. A communication system using an asynchronous communication network for synchronous communication, comprising:
    a clock supplier which generates a reference clock;
    a master communication device interposed between the clock supplier and the asynchronous communication network; and
    plural slave communication devices one of which is provided for each of plural synchronous communication networks and is interposed between a corresponding synchronous communication network and the asynchronous communication network,
    wherein the master communication device includes;
    a reference clock receiving means which receives the reference clock generated by the clock supplier;
    a master clock generating means which generates a master clock which is synchronized with the reference clock received by the reference clock receiving means;
    a synchronization information generating means which generates synchronization information which contains information about the master clock; and
    a synchronization information frame transmitting means which generates a synchronization information frame which stores the synchronization information, and which sends the generated synchronization information frame to each of the plural slave communication devices through the asynchronous communication network, and
    wherein each of the slave communication devices includes:
    an asynchronous frame transmitting and receiving means which receives, through the asynchronous communication network, a synchronization information frame sent from the master communication device and an asynchronous frame sent from another slave communication device, and which sends an asynchronous frame to another slave communication device through the asynchronous communication network;
    a synchronous frame transmitting and receiving means which communicates a synchronous frame with a communication machine in the synchronous communication network;
    a frame converting means which converts a synchronous frame which is received by the synchronous frame transmitting and receiving means into an asynchronous frame format, to have the asynchronous frame transmitting and receiving means send an asynchronous frame obtained through the conversion, and which converts an asynchronous frame which is received by the asynchronous frame transmitting and receiving means into a synchronous frame format, to have the synchronous frame transmitting and receiving means send a synchronous frame obtained through the conversion;
    a synchronous frame extracting means which extracts the synchronization information frame from a frame which is received by the asynchronous frame transmitting and receiving means; and
    a clock reproducing means which reproduces the master clock from the synchronization information frame extracted by the synchronous frame extracting means, and which supplies the reproduced master clock to the asynchronous frame transmitting and receiving means, the synchronous frame transmitting and receiving means, the frame converting means, and the synchronous frame extracting means,
    wherein the synchronization information generating means also generates clock information, which is information indicating whether or not the reference clock is received normally by the reference clock receiving means,
    wherein the synchronization information frame transmitting means stores the clock information in the synchronization information frame, and
    wherein, when there is an indication stored in the clock information in the synchronization information frame that the reference clock receiving means has failed to receive the reference clock normally or when the asynchronous frame transmitting and receiving means has failed to receive the synchronization information frame within the given period of time, the clock reproducing means continues to supply the master clock, which has been reproduced immediately beforehand, to the asynchronous frame transmitting and receiving means, the synchronous frame transmitting and receiving means, and the frame converting means, respectively.

2. A communication system according to claim 1, wherein each of the slave communication devices further includes:
    means which receives synchronization information frames which are sent from the master communication device via plural routes;
    means which monitors failure; and means which switches selected synchronization information frame when a failure is detected.

3. A communication system according to claim 1,
    wherein the master communication device and the plural slave communication devices respectively form, using VLAN technology conforming IEEE 802.1Q, virtual mutual communication paths which go through the asynchronous communication network, and
    wherein a value of a user priority field in a VLAN header which is attached to the synchronization information frame is set at a higher priority than a value of a user priority field in a VLAN header which is attached to an asynchronous frame communicated among the plural slave communication devices.

4. A communication system according to claim 2,
    wherein the master communication device and the plural slave communication devices respectively form, using VLAN technology conforming to IEEE 802.1Q virtual mutual communication paths which go through the asynchronous communication network, and
    wherein a value of a user priority field in a VLAN header which is attached to the synchronization information frame is set at a higher priority than a value of a user priority field in a VLAN header which is attached to an asynchronous frame communicated among the plural slave communication devices.

* * * * *